(12) United States Patent
Thanayankizil et al.

(10) Patent No.: US 8,818,719 B1
(45) Date of Patent: Aug. 26, 2014

(54) METHOD OF CONTROLLING DATA COMMUNICATION BETWEEN A VEHICLE AND HETEROGENEOUS WIRELESS NETWORKS

(71) Applicant: GM Global Technology Operations LLC, Detroit, MI (US)

(72) Inventors: Lakshmi Thanayankizil, Rochester Hills, MI (US); Timothy J. Talty, Beverly Hills, MI (US); Massimo Osella, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/773,988

(22) Filed: Feb. 22, 2013

(51) Int. Cl.
*G05D 1/00* (2006.01)
(52) U.S. Cl.
USPC ............................................ 701/468; 340/988
(58) Field of Classification Search
USPC .................. 701/1, 23, 533, 468; 340/988, 990
See application file for complete search history.

(56) References Cited

U.S. PATENT DOCUMENTS

2005/0254435 A1 * 11/2005 Moakley et al. ............... 370/252

* cited by examiner

*Primary Examiner* — Thomas Black
*Assistant Examiner* — Luke Huynh
(74) *Attorney, Agent, or Firm* — Quinn Law Group, PLLC

(57) ABSTRACT

A method of controlling data communication between a vehicle and a plurality of wireless networks includes tracking a location of the vehicle over time to identify a known route, and tracking a signal duration for each of the plurality of wireless networks. One of the plurality of wireless networks that provides the longest signal duration for the vehicle, and which is available for data communication with the vehicle along the identified known route, is identified. When a current route of the vehicle is the same as the known route, data communication from the vehicle is connected to the available wireless network identified as providing the longest signal duration for the vehicle when moving along the identified known route.

17 Claims, 2 Drawing Sheets

METHOD OF CONTROLLING DATA COMMUNICATION BETWEEN A VEHICLE AND HETEROGENEOUS WIRELESS NETWORKS

TECHNICAL FIELD

The invention generally relates to a method of controlling wireless data communications between a vehicle and a plurality of different wireless networks.

BACKGROUND

In order to implement various vehicle monitoring/service programs, data may need to be transmitted to a remote location via a wireless network. As the vehicle travels along a route, many different wireless networks become available to the vehicle to connect with, while others become un-available. Typically, the vehicle selects the available wireless network that currently has the strongest signal to connect with for data transfer, regardless of how long that specific wireless network is available to the vehicle along the vehicle's route. The vehicle will typically switch to a second wireless network when the signal strength of the second wireless network becomes stronger than the wireless network the vehicle is currently connected to, or the signal strength of the connected hotspot goes beyond a pre-defined threshold.

SUMMARY

A method of controlling data communication between a vehicle and a plurality of wireless networks is provided. The method includes tracking a location of the vehicle over time to identify a known route, and tracking a signal duration for each of the plurality of wireless networks available for data communication with the vehicle when moving along the identified known route. One of the plurality of wireless networks, which provides the longest signal duration for the vehicle, and which is available for data communication with the vehicle along the identified known route, is identified. When a current route of the vehicle is the same as the known route, the vehicle connects to the available wireless network identified as providing the longest signal duration for the vehicle when moving along the identified known route for data communication therebetween.

A vehicle is also provided. The vehicle includes a Global Positioning System (GPS) receiver operable to track a travel time, a travel duration, and a travel route of the vehicle, and a network controller coupled to the GPS receiver. The network controller receives data from the GPS receiver related to the travel time, travel duration, and the travel route, and is configured to control data communication between the vehicle and one of a plurality of heterogeneous wireless networks. The network controller is operable to identify a known route based upon the data received from the GPS receiver related to the travel time, travel duration, and the travel route, and detect a signal duration and a signal strength for each of a plurality of wireless networks available for data communication with the vehicle when moving along the identified known route. The network controller identifies which one of the plurality of wireless networks available for data communication with the vehicle along the identified known route provides the longest signal duration for the vehicle when moving along the identified known route. When a current route of the vehicle is the same as the known route, the network controller connects data communication from the vehicle to the available wireless network identified as providing the longest signal duration for the vehicle when moving along the identified known route. When the current route of the vehicle is not the same as the known route, the network controller connects data communication from the vehicle to the available wireless network having the highest signal strength.

Accordingly, when the vehicle is moving along a known route, in which the network controller knows in advance the availability of the different wireless networks that the vehicle will encounter along its travel route, the network controller may select the wireless network that provides the longest duration of connectivity for data communication, instead of simply connecting to the wireless network that has the strongest signal at any given time. Because the relative signal strength of the different wireless networks may change along the travel route of the vehicle, a control strategy that simply selects the wireless network with the strongest signal to connect to may be constantly switching between different wireless networks. Because significant data transfer time is lost when switching between and connecting with new wireless networks, control strategies that simply select the wireless network with the highest signal strength decrease the effective data transfer rate over the course of the trip. In contrast, when the network controller is able to recognize that the current route of the vehicle is the same as a previously identified known route having previously identified known wireless networks available, the control strategy of the present invention selects the available wireless network that provides the longest duration of connectivity, thereby decreasing the time spent negotiating with new networks, which increases the effective data transfer rate over the course of the trip.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a map showing a known travel route of a vehicle and the availability of a plurality of different wireless networks for the vehicle to connect with.

DETAILED DESCRIPTION

Those having ordinary skill in the art will recognize that terms such as "above," "below," "upward," "downward," "top," "bottom," etc., are used descriptively for the figures, and do not represent limitations on the scope of the invention, as defined by the appended claims.

Figure 1:
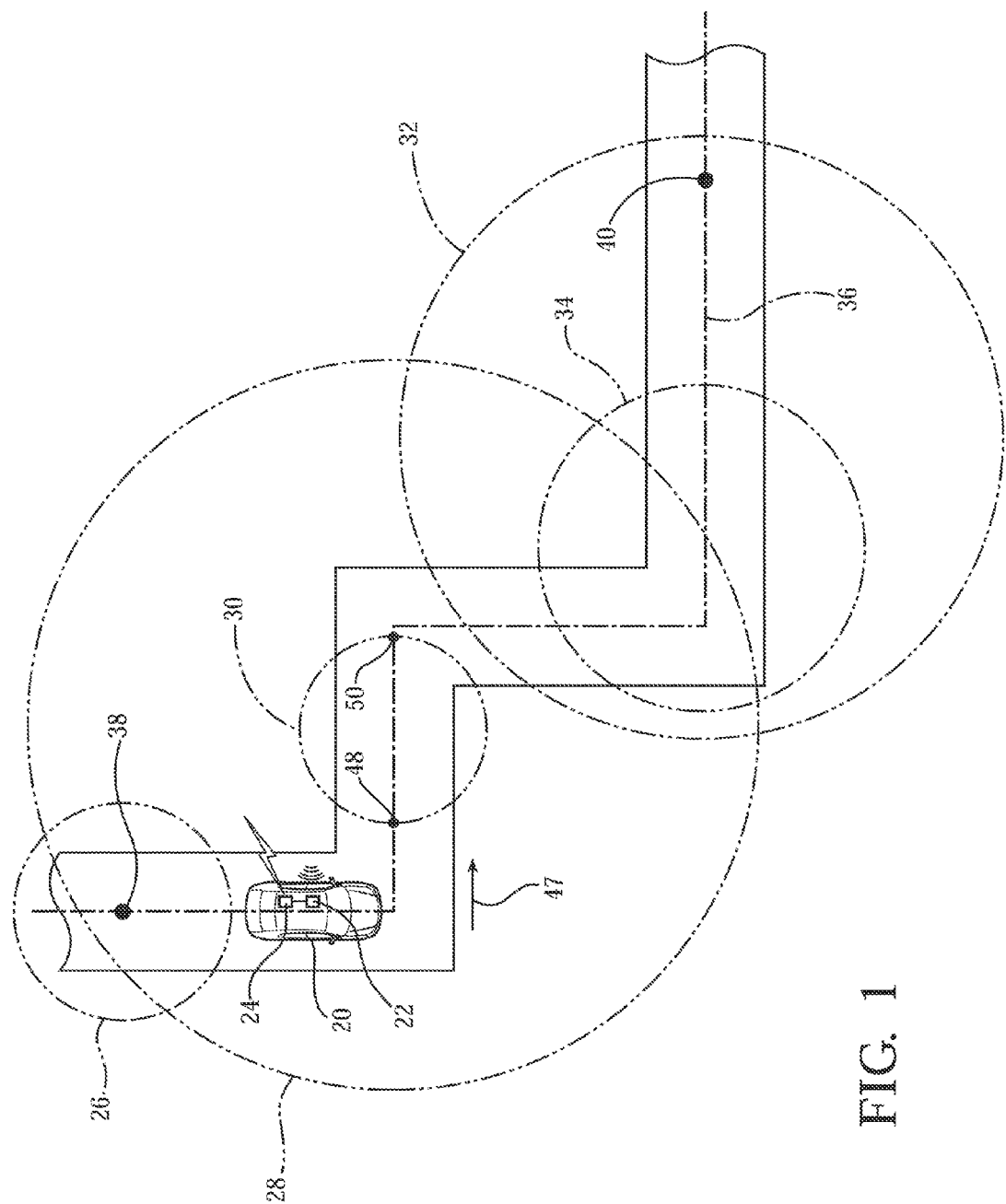

Referring to the Figures, wherein like numerals indicate like parts throughout the several views, a vehicle is generally shown at 20 in FIG. 1. The vehicle 20 may include any type and/or style of vehicle 20, and includes a Global Positioning System (GPS) receiver 22. The GPS receiver 22 may include any receiver capable of receiving a signal from a plurality of GPS satellites in order to determine the time and position of the vehicle 20 as is known in the art. When used to track the position of the vehicle 20 over time, the GPS receiver 22 is capable of tracking a travel time of the vehicle 20, a travel duration of the vehicle 20, and a travel route of the vehicle 20.

The vehicle 20 further includes a network controller 24. The network controller 24 is coupled to the GPS receiver 22, and is operable to receive data from the GPS receiver 22 related to the travel time, travel duration, and the travel route of the vehicle 20. The network controller 24 may include a computer and/or processor, and include all software, hardware, memory, algorithms, connections, sensors, etc., necessary to manage and control the data communication and connectivity with a plurality of heterogeneous wireless networks. As such, a method, described in greater detail below, may be embodied as a program operable on the network controller 24. It should be appreciated that the network controller 24 may include any device capable of analyzing data from various sensors, comparing data, making the necessary decisions required to control the data communication and connectivity with the wireless networks 26, 28, 30, 32, 34.

Figure 2:
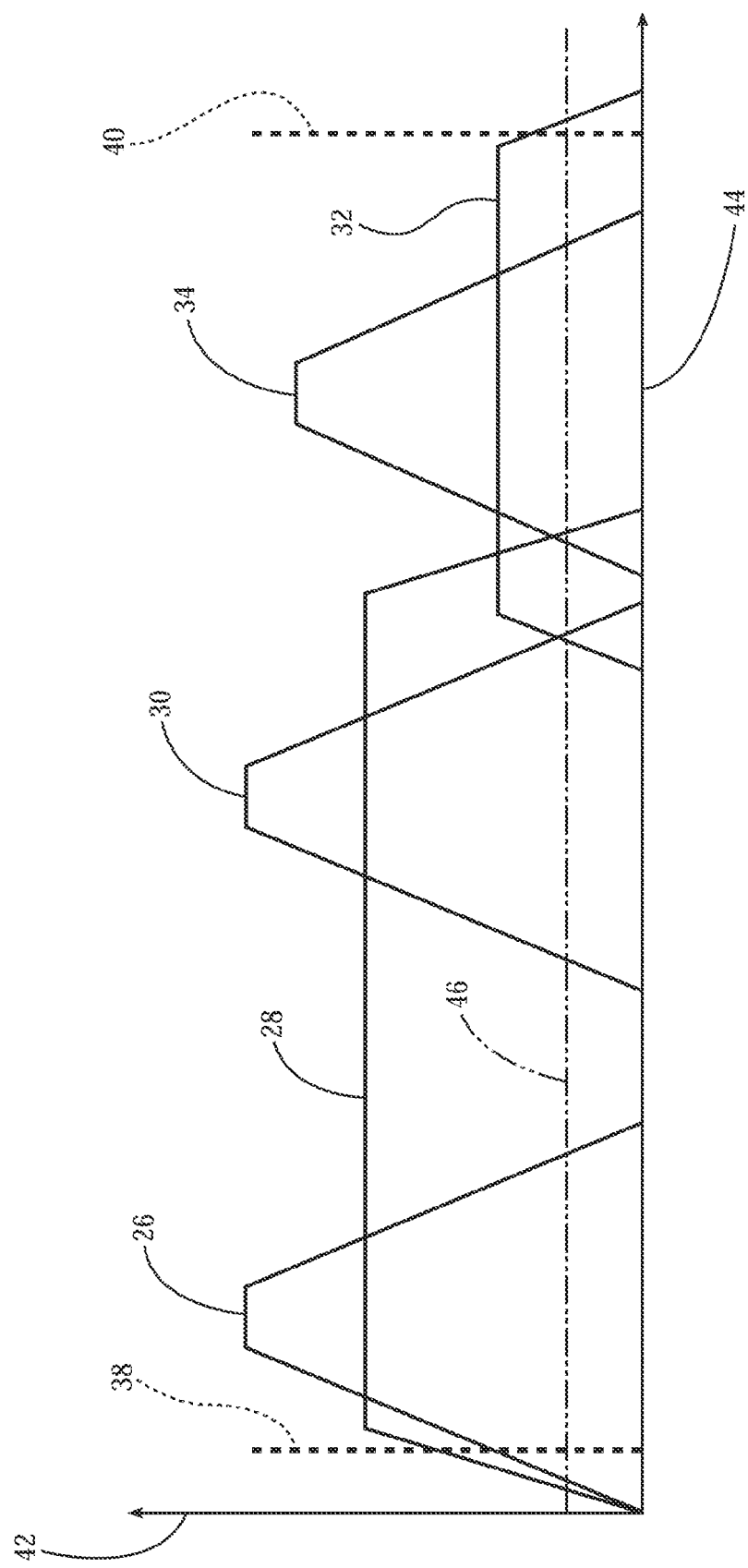
FIG. 2 is a chart showing the signal strength for each of the different wireless networks along the known travel route.

Referring to FIGS. 1 and 2, a service area for each of a plurality of different wireless networks is shown in FIG. 1 by a boundary region associated with each of the different wireless networks. The different wireless networks include a first wireless network 26, a second wireless network 28, a third wireless network 30, a fourth wireless network 32, and a fifth wireless network 34. Each of the plurality of different wireless networks 26, 28, 30, 32, 34 is positioned along a known travel route 36 of the vehicle 20. The known route 36 includes a start point 38 and an end point 40. The signal strength and the signal duration for the coverage areas of each of the different plurality of wireless networks 26, 28, 30, 32, 34 are represented in FIG. 2. The signal strength for each of the plurality of wireless networks 26, 28, 30, 32, 34 is shown along a vertical axis 42 of FIG. 2, and the signal duration for each of the plurality of wireless networks 26, 28, 30, 32, 34 is shown along a horizontal axis 44 of FIG. 2.

As the vehicle 20 begins moving along the known route 36 from the start point 38, both the first wireless network 26 and the second wireless network 28 are available for the network controller 24 to connect with. As shown in FIG. 2, the first wireless network 26 includes a higher signal strength than the second wireless network 28, but the second wireless network 28 includes a longer signal duration than the first wireless network 26, i.e., the second wireless network 28 is available for a longer duration of time as the vehicle 20 moves along the known route 36. As the vehicle 20 continues along the known route 36, the vehicle 20 will move out of the service area of the first wireless network 26, and then into the service area of the third wireless network 30, all while staying within the service area of the second wireless network 28. Similar to the first wireless network 26, the third wireless network 30 includes a higher signal strength than the second wireless network 28, but includes a shorter signal duration than the second wireless network 28. As the vehicle 20 continues further along the known route 36, the vehicle 20 leaves the service area of the third wireless network 30, and enters the service area of the fourth wireless network 32 and the fifth wireless network 34, while staying within the service area of the second wireless network 28. The fourth wireless network 32 includes a signal strength that is slightly less than the second wireless network 28, and a signal duration that is approximately equal to the second wireless network 28, yet longer than the first wireless network 26 and the third wireless network 30. The service area of the fifth wireless network 34 overlaps with the service area of the second wireless network 28 and the fourth wireless network 32. The signal strength of the fifth wireless network 34 is higher than the signal strength of the fourth wireless network 32, but the signal duration of the fifth wireless network 34 is less than the signal duration of the fourth wireless network 32. As the vehicle 20 continues on to the end point 40 of the known route 36, the vehicle 20 exits the service area of the second wireless network 28 and the fifth wireless network 34, while remaining within the service area of the fourth wireless network 32.

If the network controller 24 knows, or has previously learned the position of the known route 36, as well as the beginning and end locations (hereinafter referred to as the begin signal location and an end signal location respectively) of the service areas for each of the wireless networks 26, 28, 30, 32, 34 along the known route 36, then the network controller 24 may select which of the wireless networks 26, 28, 30, 32, 34 to connect with to maximize data transfer from the vehicle 20. Although the begin signal location and the end signal location for each of the different networks are not specifically noted in FIG. 1, it should be appreciated that the begin signal location for a specific network is the location along the known route 36 when the vehicle 20 enters the service area of that network, and the end signal location is the location along the known route 36 when the vehicle 20 exits the service area for that network. For illustrative purposes and as shown in FIG. 1, for the vehicle 20 moving along the known route 36 in a direction indicated by arrow 47, the begin signal location for the third wireless network 30 is shown at 48, and the end signal location of the third wireless network 30 is shown at 50.

Significant data transfer time is lost while the network controller 24 negotiates a connection with a network. In order to maximize the data transfer time available to the vehicle 20, the network controller 24 may select the available wireless network that provides the longest signal duration, rather than simply selecting the wireless network with the strongest available signal at any given time. Accordingly, in the illustrative example shown in FIGS. 1 and 2, when the network controller 24 recognizes that the vehicle 20 is moving along or entering the known route 36 at the start point 38, the network controller 24 may choose between the first wireless network 26 and the second wireless network 28. It should be noted that in order for the network controller 24 to select a wireless network to connect to, the signal strength of the wireless network must be greater than a required minimum strength 46, shown in FIG. 2. A wireless network with a signal strength below the required minimum strength 46 will not be considered for selection unless no other networks are available. Because the network controller 24 has learned the begin signal location and the end signal location for each of the different wireless networks 26, 28, 30, 32, 34 along the known route, the network controller 24 may choose to connect to the second wireless network 28, even though the first wireless network 26 provides a stronger signal, because the second wireless network 28 provides a longer signal duration along the known route 36. Similarly, when the vehicle 20 passes through the service area for the third wireless network 30, the network controller 24 will continue the connection with the second wireless network 28 and not connect to the third wireless network 30, even though the third wireless network 30 includes a stronger signal. Upon the vehicle 20 reaching the end signal location for the second wireless network 28, the network controller 24 must decide which of the fourth wireless network 32 or the fifth wireless network 34 to connect with. Because the fourth wireless network 32 provides the longer signal duration while moving along the known route 36, the network controller 24 may choose to connect with the fourth wireless network 32, even though the fifth wireless network 34 includes a higher signal strength. The network controller 24 may maintain connectivity with the fourth wireless network 32 as the vehicle 20 moves along the known route 36 and reaches the end point 40 of the known route 36. In so doing, the network controller 24 connects with only the second wireless network 28 and the fourth wireless network 32, thereby maximizing the connectivity duration and minimizing the time lost during connection processes. In contrast, a control strategy that selects the wireless network based on the strongest currently available signal would require the network controller 24 to make six different network connections as the vehicle 20 moves along the known route 36 between the start point 38 and the end point 40.

It should be appreciated that other criteria, in addition to the signal duration, may be considered when selecting which wireless network to select for connection as well. For example, many Wi-Fi networks are publically available and free for use, whereas the cellular networks, e.g., 2g, 3g, or 4g networks, may require payment of fees for use. Accordingly, the network controller 24 may be programmed to prefer or select an available no charge Wi-Fi network over a required fee cellular network to minimize cost to the consumer. For example, referring to FIG. 1, if the second wireless network 28 includes a required fee network, and the third wireless network 30 includes a no charge Wi-Fi network, the network controller 24 may switch connections from the second wireless network 28 to the third wireless network 30 to avoid usage fees in the service area provided by the third wireless network 30.

As noted above, the network controller 24 is operable to control data communication and network connectivity with the different wireless networks 26, 28, 30, 32, 34. More specifically, the network controller 24 is operable to perform the various steps of the method described below.

The network controller 24 uses the information from the GPS receiver 22 related to the travel time of the vehicle 20, the travel duration of the vehicle 20, and the travel route of the vehicle 20 to track a location of the vehicle 20 over time to identify the known route 36. The known route 36 may include for example, a common route traveled to and from a work destination at a consistent time each day. The network controller 24 may track all movement of the vehicle 20 and log each trip as a known route 36, or may alternatively determine that only travel routes that are repeated with a certain frequency are defined as a known route 36. The network controller 24 also tracks the available wireless network signals disposed along each of the known routes 36. The network controller 24 may learn the begin signal location and the end signal location, as well as the signal duration and the signal strength for each wireless network disposed along the known route 36. The network controller 24 may then save the identified known route 36 and the information related to the available wireless networks 26, 28, 30, 32, 34, such as but not limited to the signal duration, the begin signal location, the end signal location, and the signal strength, in a memory of the network controller 24. The network controller 24 may use the information related to the wireless networks 26, 28, 30, 32, 34 to identify which one of the plurality of wireless networks 26, 28, 30, 32, 34 that is available for data communication with the vehicle 20 along the identified known route 36 provides the longest signal duration for the vehicle 20.

If the vehicle 20 is traveling along a current route that the network does not recognize as a known route 36, then the network controller 24 may connect to the available wireless network having the highest signal strength for data communication therewith. Simultaneously, the network controller 24 may define this current travel route as a new known travel route, and track and learn the available wireless connections and related information, including signal strength, signal duration, begin signal location and end signal location, for each available wireless network disposed along this new learned travel route. This information may be saved in the memory of the network controller 24 so that the network controller 24 may recognize this new learned travel route as a known travel route the next time the vehicle 20 moves along this route.

Upon the next occurrence of the vehicle 20 entering the start point 38 of a previously identified known route 36, the network controller 24 recognizes that the current route of the vehicle 20 is the same as the previously identified known route 36 of the vehicle 20, and selects the wireless network to connect with based upon the longest signal duration. Accordingly, when the current route is the same as the known route 36, the network controller 24 connects data communication from the vehicle 20 to the available wireless network identified as providing the longest signal duration for the vehicle 20 when moving along the identified known route 36. The network controller 24 may connect to the available wireless network identified as providing the longest signal duration for the vehicle 20 upon the vehicle 20 reaching the begin signal location for that wireless network. Upon the vehicle 20 nearing the end signal location of a wireless network, the network controller 24 selects that next wireless network to connect to based upon the signal duration of the then available wireless networks 26, 28, 30, 32, 34. For example, referring to FIG. 1, upon the vehicle 20 nearing the end signal location of the second wireless network 28, the network controller 24 would select the fourth wireless network 32 to connect to for the remainder of the trip along the known route 36. Once the next wireless network is selected, e.g., the fourth wireless network 32 in the example shown in FIG. 1, the network controller 24 will transfer data communication from the vehicle 20 to the next selected wireless network.

It should be appreciated that the known route and the wireless networks depicted in FIGS. 1 and 2 are merely exemplary, and that the number and location of routes, as well as the number and location of the wireless networks may differ from the exemplary example shown in FIGS. 1 and 2 and described above.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A method of controlling data communication between a vehicle and a plurality of wireless networks, the method comprising:
   tracking a location of the vehicle over time to identify a known route;
   tracking a signal duration for each of the plurality of wireless networks available for data communication with the vehicle when moving along the identified known route;
   identifying which one of the plurality of wireless networks available for data communication with the vehicle along the identified known route provides the longest signal duration for the vehicle; and
   connecting data communication from the vehicle moving along a current route to the available wireless network identified as providing the longest signal duration for the vehicle when moving along the identified known route, when the current route is the same as the known route.

2. A method as set forth in claim 1 wherein the vehicle includes a Global Positioning System (GPS) receiver, and wherein tracking a location of the vehicle over time is further defined as tracking a driving time and location of the vehicle with the GPS receiver.

3. A method as set forth in claim 1 further comprising identifying a begin signal location and an end signal location for each of the plurality of wireless networks available for data communication with the vehicle along the known route.

4. A method as set forth in claim 3 further comprising tracking a signal strength for each of the wireless networks available for data communication with the vehicle along the known route.

5. A method as set forth in claim 4 wherein identifying which one of the plurality of wireless networks provides the longest signal duration for the vehicle is further defined as identifying which one of the plurality of wireless networks provides the longest signal duration for the vehicle with a signal strength greater than a required minimum strength.

6. A method as set forth in claim 5 wherein connecting data communication from the vehicle to the available wireless network identified as providing the longest signal duration for the vehicle is further defined as connecting data communication from the vehicle to the available wireless network identified as providing the longest signal duration for the vehicle upon the vehicle reaching the begin signal location for that wireless network.

7. A method as set forth in claim 6 further comprising transferring data communication from the vehicle to another available wireless network upon reaching the end signal available location.

8. A method as set forth in claim 4 further comprising connecting data communication from the vehicle moving along the current route to the available wireless network having the highest signal strength when the current route is not the same as the known route.

9. A method as set forth in claim 1 further comprising recognizing the current route of the vehicle as a previously identified known route of the vehicle.

10. A method as set forth in claim 1 further comprising saving the identified known route and the signal duration for each of the associated wireless networks available for data communication with the vehicle along the identified known route, in a memory of the network controller.

11. A vehicle comprising:
   a Global Positioning System (GPS) receiver operable to track a travel time, a travel duration, and a travel route;
   a network controller coupled to the GPS receiver for receiving data from the GPS related to the travel time, travel duration, and the travel route, wherein the network controller is operable to:
      identify a known route based upon the data received from the GPS receiver related to the travel time, travel duration, and the travel route;
      detect a signal duration and a signal strength for each of a plurality of wireless networks available for data communication with the vehicle when moving along the identified known route;
      identify which one of the plurality of wireless networks available for data communication with the vehicle along the identified known route provides the longest signal duration for the vehicle moving along the identified known route;
      connect data communication from the vehicle moving along a current route to the available wireless network identified as providing the longest signal duration for the vehicle when moving along the identified known route, when the current route is the same as the known route; and
      connecting data communication from the vehicle moving along the current route to the available wireless network having the highest signal strength when the current route is not the same as the known route.

12. A vehicle as set forth in claim 11 wherein the controller is operable to identify which one of the plurality of wireless networks provides the longest signal duration for the vehicle with a signal strength greater than a required minimum strength.

13. A vehicle as set forth in claim 11 wherein the network controller is operable to identify a begin signal location and an end signal location for each of the plurality of wireless networks available for data communication with the vehicle along the known route based upon the data received from the GPS receiver related to the travel time, travel duration, and the travel route, and the detected signal strength of each of the available wireless networks.

14. A vehicle as set forth in claim 13 wherein the network controller is operable to connect data communication from the vehicle to the available wireless network identified as providing the longest signal duration for the vehicle upon the vehicle reaching the begin signal location for that wireless network.

15. A vehicle as set forth in claim 13 wherein the network controller is operable to transfer data communication from the vehicle to another available wireless network upon reaching the end signal available location.

16. A vehicle as set forth in claim 11 wherein the network controller is operable to recognize the current route of the vehicle as a previously identified known route of the vehicle.

17. A vehicle as set forth in claim 11 wherein the network controller is operable to save the identified known route, the signal duration, and the signal strength for each of the associated wireless networks available for data communication with the vehicle along the identified known route, in a memory of the network controller.

* * * * *